United States Patent
Takeno et al.

(10) Patent No.: US 12,534,885 B2
(45) Date of Patent: Jan. 27, 2026

(54) WORK MACHINE AND CONTROL METHOD FOR WORK MACHINE

(71) Applicant: KOMATSU LTD., Tokyo (JP)

(72) Inventors: Akira Takeno, Tokyo (JP); Shinichi Kitao, Tokyo (JP); Akihiro Koyama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 198 days.

(21) Appl. No.: 18/549,011

(22) PCT Filed: Jan. 20, 2022

(86) PCT No.: PCT/JP2022/001966
§ 371 (c)(1),
(2) Date: Sep. 5, 2023

(87) PCT Pub. No.: WO2022/201805
PCT Pub. Date: Sep. 29, 2022

(65) Prior Publication Data
US 2024/0151009 A1    May 9, 2024

(30) Foreign Application Priority Data
Mar. 26, 2021    (JP) .................................. 2021-053325

(51) Int. Cl.
*E02F 9/26*  (2006.01)
*E02F 9/20*  (2006.01)
*E02F 9/22*  (2006.01)

(52) U.S. Cl.
CPC ............ *E02F 9/262* (2013.01); *E02F 9/2083* (2013.01); *E02F 9/226* (2013.01)

(58) Field of Classification Search
CPC .......... E02F 9/262; E02F 9/2083; E02F 9/226
See application file for complete search history.

(56) References Cited

U.S. PATENT DOCUMENTS 10,920,402 B2   2/2021  Kajiwara et al.
2012/0296530 A1  11/2012  Hyodo et al.
(Continued)

FOREIGN PATENT DOCUMENTS

CN   107428367 A   12/2017
JP   2006-123711 A   5/2006
(Continued)

OTHER PUBLICATIONS

The extended European search report for the corresponding European application No. 22774608.8 issued on Nov. 5, 2024.
(Continued)

*Primary Examiner* — Michael D Lang
(74) *Attorney, Agent, or Firm* — GLOBAL IP COUNSELORS, LLP

(57) ABSTRACT

A work machine includes a vehicle body, a travel direction detecting section that detects a travel direction of the vehicle body, an object detecting section that detects an object in a predetermined direction of the vehicle body, a braking section, a setting section. and a control section. The braking section is able to implement automatic braking of the vehicle body and exert a braking force based on a detection of the object. The setting section sets the braking section so that the automatic braking force can be or cannot be exerted. The control section controls the setting section to set the braking section so that the braking force can be exerted when the vehicle body is traveling in the predetermined direction, and to set the braking section so that the braking force cannot be exerted when the vehicle body is traveling in a direction other than the predetermined direction.

9 Claims, 7 Drawing Sheets

(56) References Cited

U.S. PATENT DOCUMENTS

| | | |
|---|---|---|
| 2014/0288787 A1 | 9/2014 | Hyodo et al. |
| 2021/0009116 A1 | 1/2021 | Fujiyoshi et al. |
| 2021/0017737 A1 | 1/2021 | Schwartz et al. |
| 2022/0001844 A1 | 1/2022 | Tanii et al. |

FOREIGN PATENT DOCUMENTS

| | | |
|---|---|---|
| JP | 2011-122707 A | 6/2011 |
| JP | 2013-104509 A | 5/2013 |
| JP | 3219005 U | 11/2018 |
| JP | 2019-114030 A | 7/2019 |
| JP | 2020-153114 A | 9/2020 |
| WO | 2019/180843 A1 | 9/2019 |
| WO | 2020/129573 A1 | 6/2020 |

OTHER PUBLICATIONS

The Decision of Rejection for the corresponding Japanese application No. 2021-053325, issued on Nov. 12, 2024.
The International Search Report for the corresponding international application No. PCT/JP2022/001966, issued on Apr. 12, 2022.
First Office Action received for Chinese Patent Application No. 202280016537.X, mailed on Jun. 26, 2025, 9 pages.

WORK MACHINE AND CONTROL METHOD FOR WORK MACHINE

CROSS-REFERENCE TO RELATED APPLICATIONS

This application is a U.S. National stage application of International Application No. PCT/JP2022/001966, filed on Jan. 20, 2022. This U.S. National stage application claims under 35 U.S.C. § 119(a) to Japanese Patent Application No. 2021-053325, filed in Japan on Mar. 26, 2021, the entire contents of which are hereby incorporated herein by reference.

BACKGROUND

Technical Field

The present invention relates to a work machine and a method for controlling the work machine.

Background Information

An automatic stopping system has been proposed for detecting an obstacle to the rear and stopping automatically in a wheel loader that is an example of a work machine (for example, see Registration of Utility Model No. 3219005).

For example, in the wheel loader described in Registration of Utility Model No. 3219005, the area from the wheel loader to an object is divided into three areas made up of a first area, a second area, and a third area in order of proximity from the object, and the brake is activated automatically and the vehicle is stopped in the third area that is the shortest distance from the wheel loader.

SUMMARY

However, work is hindered when the automatic brake is activated and braking is performed in an unintended travel direction.

An object of the present disclosure is to provide a work machine and a method for controlling the work machine with which it is possible to suppress a malfunction due to the exertion of a braking force by means of automatic braking only in a desired travel direction.

A work machine according to the present embodiment comprises a vehicle body, a travel direction detecting section, an object detecting section, a braking section, a setting section, and a control section. The vehicle body is travelable. The object detecting section detects an object in a predetermined direction of the vehicle body. The braking section is able to implement automatic braking for automatically braking the vehicle body and exert a braking force based on the detection of the object by the object detecting section. The setting section sets the braking section so that the braking force by the automatic braking can be or cannot be exerted. The control section controls the setting section to set the braking section so that when the vehicle body is traveling in a predetermined direction, the braking force can be exerted, and when the vehicle body is traveling in a direction other than the predetermined direction, the braking force cannot be exerted.

A control method for a work machine according to another embodiment comprises a travel direction detecting step, an object detecting step, and a setting step. The travel direction detecting step involves detecting the travel direction of the vehicle body. The object detecting step involves detecting an object in a predetermined direction of the vehicle body. The setting step involves setting so that a braking force produced by implementing automatic braking for automatically braking the vehicle body based on detection of an object in the object detecting step can be exerted when the vehicle body is traveling in a predetermined direction, and setting so that the braking force cannot be exerted when the vehicle body is traveling in a direction other than the predetermined direction.

According to the present disclosure, there can be provided a work machine and a control method for the work machine with which it is possible to suppress a malfunction due to the exertion of a braking force by means of automatic braking only in a desired travel direction.

DETAILED DESCRIPTION OF EMBODIMENT(S)

The following is an explanation of a wheel loader as an example of a work machine according to the present disclosure with reference to the drawings.

(Outline of Wheel Loader)

Figure 1:
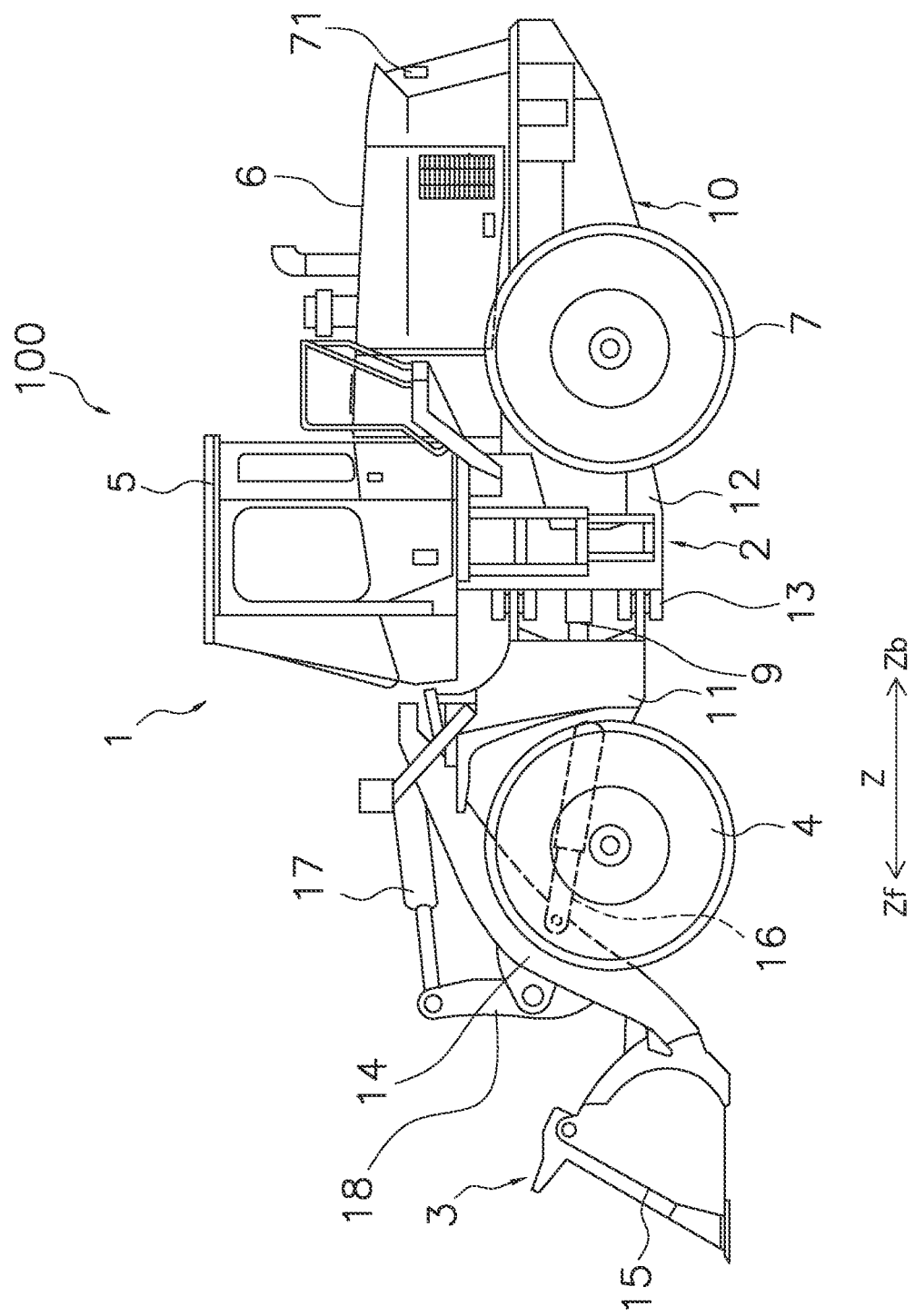
FIG. 1 is side view illustrating a wheel loader according to an embodiment of the present disclosure.

FIG. 1 is a schematic view of a configuration of the wheel loader 100 (example of a work machine) of the present embodiment. The wheel loader 100 of the present embodiment has a vehicle body 1, a traveling unit 2, and a work implement 3. The work implement 3 is disposed on the traveling unit 2. The traveling unit 2 is provided with a vehicle body frame 10, a pair of front tires 4, a cab 5, an engine room 6, a pair of rear tires 7, and a steering cylinder 9. In the following explanations, "front," "rear," "right," "left," "up," and "down" indicate directions relative to a state of looking forward from the driver's seat. "Vehicle width direction" and "left-right direction" have the same meaning. In FIG. 1, the front-back direction is represented by Z, and Zf is used to indicate the forward direction and Zb is used to indicate the rearward direction.

The wheel loader 100 performs work such as earth and sand loading by using the work implement 3.

The vehicle body frame 10 is a so-called articulated construction and has a front frame 11, a rear frame 12, and a coupling shaft part 13. The front frame 11 is disposed in front of the rear frame 12. The coupling shaft part 13 is provided in the center in the vehicle width direction and couples the front frame 11 and the rear frame 12 to each other in a manner that allows swinging. The pair of front tires 4 are attached to the left and right of the front frame 11. The pair of rear tires 7 are attached to the left and right of the rear frame 12.

The work implement 3 is driven by hydraulic fluid from a work implement pump which is not illustrated. The work implement 3 includes a boom 14, a bucket 15, a lift cylinder 16, and a bucket cylinder 17. The boom 14 is mounted onto the front frame 11. The bucket 15 is attached to the tip of the boom 14.

The lift cylinder 16 and the bucket cylinder 17 are hydraulic cylinders. One end of the lift cylinder 16 is attached to the front frame 11 and the other end of the lift cylinder 16 is attached to the boom 14. The boom 14 swings up and down due to the extension and contraction of the lift cylinder 16. One end of the bucket cylinder 17 is attached to the front frame 11 and the other end of the bucket cylinder 17 is attached to the bucket 15 via a bell crank 18. The bucket 15 swings up and down due to the extension and contraction of the bucket cylinder 17.

The cab 5 is disposed on the rear frame 12. A steering handle for performing steering operations, a lever for operating the work implement 3, and various display devices are disposed inside the cab 5. The engine room 6 is arranged to the rear of the cab 5 and on the rear frame 12 and contains an engine 31.

Figure 2:
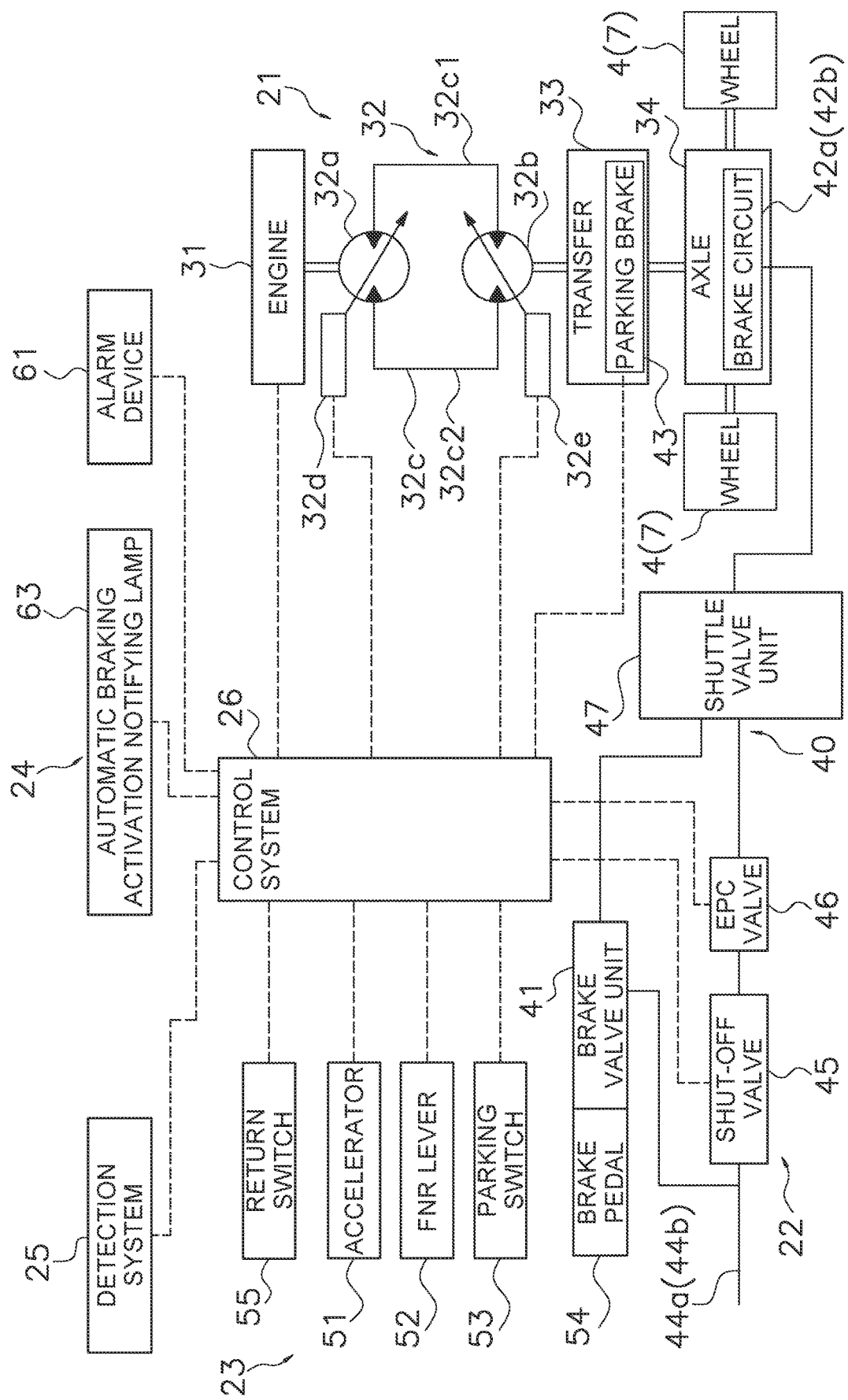
FIG. 2 is a block diagram illustrating a control system of the wheel loader in FIG. 1.

FIG. 2 is a block diagram illustrating a configuration of the wheel loader 100.

The wheel loader 100 has a driving system 21, a braking system 22, an operating system 23, a warning system 24, a detection system 25, and a control system 26 (example of a control section).

The driving system 21 performs driving of the wheel loader 100. The braking system 22 performs braking of the wheel loader 100. The operating system 23 is operated by an operator. The warning system 24 issues a warning to the operator on the basis of a detection result by the detection system 25. The detection system 25 detects the travel direction of the vehicle body 1 and an object in the rearward direction (example of a predetermined direction) of the vehicle body 1. The control system 26 operates the driving system 21, the braking system 22, and the warning system 24 on the basis of an operation by the operator on the operating system 23 and a detection by the detection system 25.

(Driving System 21)

The driving system 21 has the engine 31, an HST 32, a transfer 33, axles 34, and the front tires 4 and the rear tires 7.

The engine 31 is, for example, a diesel engine and driving power generated by the engine 31 drives a pump 32a of the hydrostatic transmission (HST) 32.

The HST 32 includes the pump 32a, a motor 32b, and a hydraulic circuit 32c that connects the pump 32a and the motor 32b. The pump 32a is a skew plate-type variable capacity pump and the angle of the skew plate can be changed with a solenoid 32d. The pump 32a is driven by the engine 31 to discharge hydraulic fluid. The discharged hydraulic fluid is fed to the motor 32b through the hydraulic circuit 32c. The motor 32b is a skew plate-type pump and the angle of the skew plate can be changed with a solenoid 32e. The hydraulic circuit 32c has a first drive circuit 32c1 and a second drive circuit 32c2. The hydraulic fluid is supplied to the motor 32b from the pump 32a through the first drive circuit 32c1 whereby the motor 32b is driven in one direction (for example, the forward travel direction). The hydraulic fluid is supplied to the motor 32b from the pump 32a through the second drive circuit 32c2 whereby the motor 32b is driven in another direction (for example, the reverse travel direction). The discharge direction of the hydraulic fluid to the first drive circuit 32c1 or to the second drive circuit 32c2 can be changed by means of the solenoid 32d.

The transfer 33 distributes the output of the engine 31 to the front and rear axles 34.

The pair of front tires 4 are connected to the front side axle 34 and rotate with the output distributed from the engine 31. The pair of rear tires 7 are connected to the rear side axle 34 and rotate with the output distributed from the engine 31.

(Braking System 22)

Figure 3:
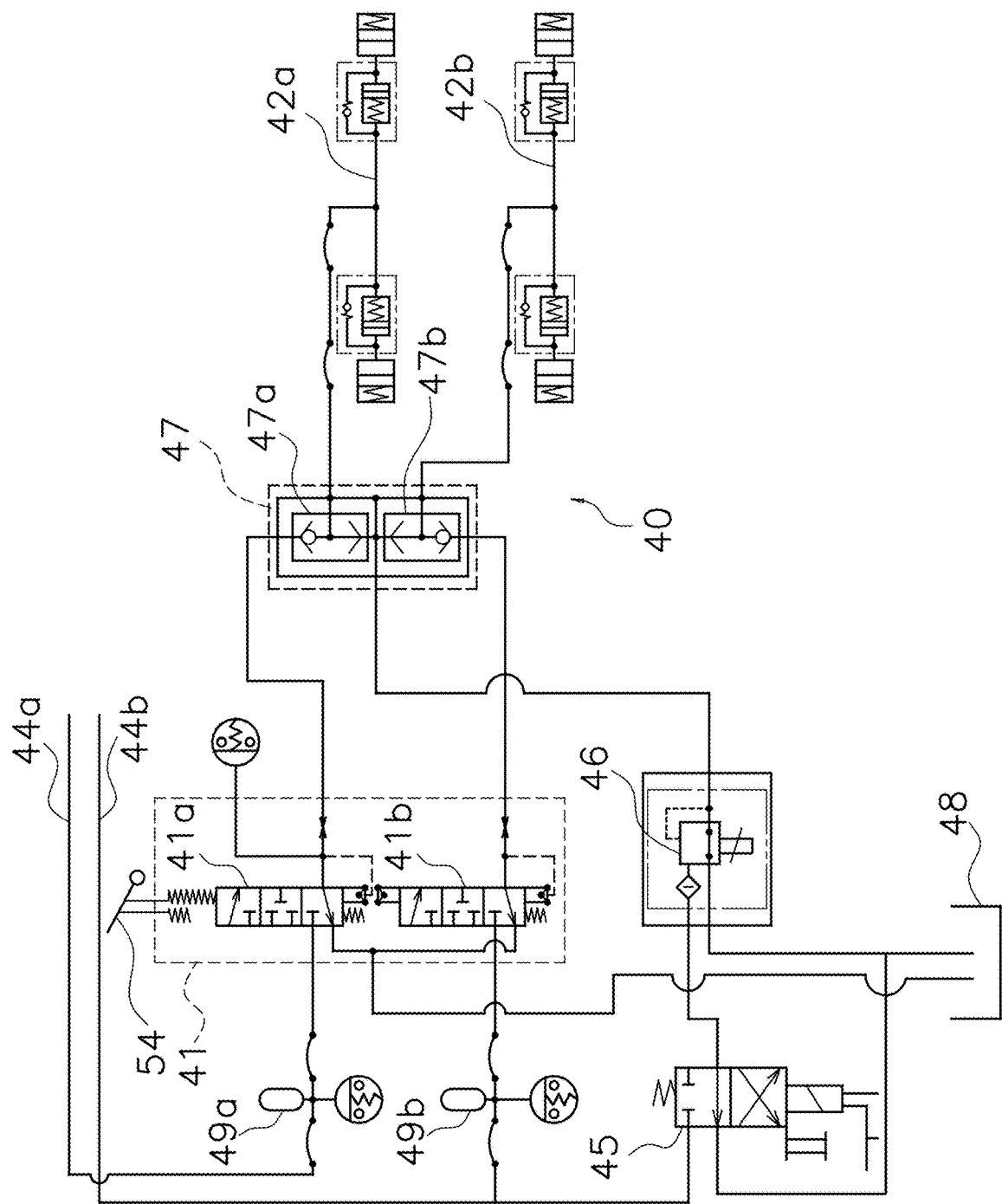
FIG. 3 is a hydraulic circuit diagram illustrating a configuration of the control system in FIG. 2.

FIG. 3 is diagram illustrating a hydraulic circuit of the braking system 22 in FIG. 2.

The braking system 22 has a braking section 40 and a shut-off valve 45 (example of a setting section and example of a shut-off valve). The braking section 40 implements braking of the vehicle body 1 based on an operation of a brake pedal 54 and implements automatic braking of the vehicle body 1 based on a command from the control system 26. The shut-off valve 45 sets the braking section 40 into a state in which the braking force by the automatic braking can be exerted or a state in which the braking force by the automatic braking cannot be exerted.

The braking section 40 has a brake valve unit 41, brake circuits 42a and 42b (example of service brake), a parking brake 43 (see FIG. 2), hydraulic fluid supply channels 44a and 44b, an electronic proportional (EPC) valve 46 (example of a regulating valve), a shuttle valve unit 47, and a tank 48.

The hydraulic fluid supply channels 44a and 44b are connected to an accumulator or a pump, etc., and are supplied with the hydraulic fluid.

The brake valve unit 41 is operated by the below mentioned brake pedal 54. As illustrated in FIG. 3, the brake valve unit 41 has a rear brake valve 41a and a front brake valve 41b. Both the rear brake valve 41a and the front brake valve 41b are three-position switching valves having three ports.

The first port of the rear brake valve 41a is connected to the hydraulic fluid supply channel 44a via an accumulator 49a. In addition, the second port of the rear brake valve 41a is connected to the tank 48. The third port of the rear brake valve 41a is connected to a rear shuttle valve 47a of the shuttle valve unit 47.

The rear brake valve 41a links the first port and the third port in a first state and connects the rear shuttle valve 47a to the hydraulic fluid supply channel 44a and supplies hydraulic fluid to the rear shuttle valve 47a. The rear brake valve 41a closes all the ports in a second state. The rear brake valve 41a connects the second port and the third port in a third state, and drains hydraulic fluid between the rear shuttle valve 47a and the rear brake valve 41a into the tank 48. The rear brake valve 41a stops the supply of hydraulic fluid to the rear shuttle valve 47a in the second state and the third state.

The first port of the front brake valve 41b is connected to the hydraulic fluid supply channel 44b via an accumulator 49b. In addition, the second port of the front brake valve 41b is connected to the tank 48. The third port of the front brake valve 41b is connected to a front shuttle valve 47b of the shuttle valve unit 47.

The front brake valve 41b links the first port and the third port in a first state and connects the front shuttle valve 47b to the hydraulic fluid supply channel 44b and supplies hydraulic fluid to the front shuttle valve 47b. The front brake valve 41b closes all the ports in a second state. The front brake valve 41b connects the second port and the third port in a third state and drains hydraulic fluid between the front shuttle valve 47*b* and the front brake valve 41*b* into the tank 48. The front brake valve 41*b* stops the supply of hydraulic fluid to the front shuttle valve 47*b* in the second state and the third state.

The opening degrees of the rear brake valve 41*a* and the front brake valve 41*b* are regulated in response to the operating amount of the brake pedal 54 and the amount of hydraulic fluid supplied to the shuttle valve unit 47 is changed. For example, when the operating amount of the brake pedal 54 is large, the amount of hydraulic fluid supplied to the shuttle valve unit 47 from the rear brake valve 41*a* and the front brake valve 41*b* is increased.

The brake circuit 42*a* is provided to the rear axle 34. The brake circuit 42*a* is connected to the rear shuttle valve 47*a*. The brake circuit 42*b* is provided to the front axle 34. The brake circuit 42*b* is connected to the front shuttle valve 47*b*. The brake circuits 42*a* and 42*b* are hydraulic brakes. The brake circuit 42*a* increases the braking force in accordance with an increase in the amount or pressure of the hydraulic fluid supplied from the rear shuttle valve 47*a*. The brake circuit 42*b* increases the braking force in accordance with an increase in the amount or pressure of the hydraulic fluid supplied from the front shuttle valve 47*b*.

The shut-off valve 45 is connected to the hydraulic fluid supply channel 44*b*. The shut-off valve 45 has four ports and is a solenoid valve that enters two states: an open state and a closed state. The first port of the shut-off valve 45 is connected to the hydraulic fluid supply channel 44*b*. The second port of the shut-off valve 45 is connected to the tank 48. The third port of the shut-off valve 45 is connected to the EPC valve 46. The fourth port of the shut-off valve 45 allows air to pass therethrough in the open state and is blocked in the closed state.

The shut-off valve 45 opens and closes on the basis of a command from the control system 26. Specifically, the shut-off valve 45 enters the open state when energized by means of an open command from the control system 26, and enters the closed state when the energization is stopped by means of a close command from the control system 26.

The shut-off valve 45 connects the first port and the third port in the open state and hydraulic fluid is supplied from the hydraulic fluid supply channel 44*b* to the EPC valve 46. Additionally, in the open state, the shut-off valve 45 connects the second port that is connected to the tank 48 to the fourth port while air is passing therethrough.

The shut-off valve 45 connects the second port and the third port in the closed state, and the hydraulic fluid between the shut-off valve 45 and the EPC valve 46 is drained into the tank 48. Additionally, the shut-off valve 45 closes the first port and the fourth port in the closed state. As a result, the shut-off valve 45 stops the supply of hydraulic fluid from the hydraulic fluid supply channel 44*b* to the EPC valve 46 in the closed state.

In the present embodiment, the control system 26 sets the shut-off valve 45 to the open state only when, for example, the vehicle body 1 is traveling in the rearward direction. The movement of the vehicle body 1 in the rearward direction is determined by the control system 26 on the basis of a detection result of a travel direction detecting section 72.

The EPC valve 46 is disposed in the flow path that connects the shut-off valve 45 and the shuttle valve unit 47. The EPC valve 46 is a solenoid valve having three ports. The first port of the EPC valve 46 is connected to the shut-off valve 45. The second port of the EPC valve 46 is connected to the tank 48. The third port of the EPC valve 46 is connected to the shuttle valve unit 47.

The EPC valve 46 connects the first port and the third port in the open state and supplies hydraulic fluid supplied from the shut-off valve 45 to the shuttle valve unit 47. The opening degree of the EPC valve 46 is regulated on the basis of a command from the control system 26 and the amount of hydraulic fluid supplied to the shuttle valve unit 47 is changed.

The first port of the EPC valve 46 is closed in the closed state and the EPC valve 46 connects the second port and the third port and drains hydraulic fluid in the flow path from the EPC valve 46 to the shuttle valve unit 47 into the tank 48. As a result, the EPC valve 46 stops the supply of hydraulic fluid from the shut-off valve 45 to the shuttle valve unit 47 in the closed state.

The shuttle valve unit 47 has the rear shuttle valve 47*a* and the front shuttle valve 47*b*. The rear shuttle valve 47*a* supplies, to the brake circuit 42*a*, hydraulic fluid having higher pressure among the hydraulic fluid supplied via the rear brake valve 41*a* and the hydraulic fluid supplied via the EPC valve 46. The front shuttle valve 47*b* supplies, to the brake circuit 42*b*, hydraulic fluid having higher pressure among the hydraulic fluid supplied via the front brake valve 41*b* and the hydraulic fluid supplied via the EPC valve 46.

As a result of the above configuration, even when the brake pedal 54 is not operated and hydraulic fluid is not supplied from the brake valve unit 41, when the shut-off valve 45 and the EPC valve 46 are in the open state due to the command from the control system 26, hydraulic fluid is supplied from the rear shuttle valve 47*a* and the front shuttle valve 47*b* to the brake circuits 42*a* and 42*b* and the control of the automatic braking is implemented.

The parking brake 43 illustrated in FIG. 2 is provided to the transfer 33. For example, a multistage wet brake or a disc brake or the like that can be switched between a braking state and a non-braking state may be used as the parking brake 43.

(Operating System 23)

As illustrated in FIG. 2, the operating system 23 includes an accelerator 51, an FNR lever 52, a parking switch 53, the brake pedal 54, and a return switch 55.

The accelerator 51 is provided inside the cab 5. The operator operates the accelerator 51 to set a throttle opening degree. The accelerator 51 generates an opening degree signal indicating an accelerator operating amount and transmits the opening degree signal to the control system 26. The control system 26 controls the rotation speed of the engine 31 on the basis of the transmitted signal.

The FNR lever 52 is provided inside the cab 5. The FNR lever 52 is able to assume the positions of forward travel, neutral, and reverse travel. An operation signal indicating the position of the FNR lever 52 is transmitted to the control system 26, and the control system 26 controls the solenoid 32*d* to switch to forward travel or the reverse travel.

The parking switch 53 is provided inside the cab 5, is a switch that can be switched to an ON or OFF state, and transmits a signal indicating the state to the control system 26. The control system 26 sets the parking brake 43 in a braking state or a non-braking state on the basis of the transmitted signal.

The brake pedal 54 is provided inside the cab 5. The brake pedal 54 regulates the opening degrees of the rear brake valve 41*a* and the front brake valve 41*b* of the brake valve unit 41.

The return switch 55 is operated by the operator for returning from a stopped state after the vehicle body 1 has stopped due to the below mentioned automatic braking.

(Warning System 24)

The warning system 24 has an alarm device 61 and an automatic braking activation notifying lamp 63.

The alarm device 61 issues an alarm to the operator due to a command from the control system 26 when an obstacle has been detected to the rear of the vehicle body 1 during reverse travel, on the basis of a detection by a rearward detecting section 71 of the below mentioned detection system 25.

The alarm device 61 may, for example, have a lamp and may cause the lamp to be lit. Moreover, the alarm device 61 is not limited to a lamp and may have a speaker and may emit a sound. Moreover, the alarm may be displayed on a display panel such as a monitor.

The automatic braking activation notifying lamp 63 warns the operator that the automatic braking is operating and notifies the operator that there is a need to perform a return action by means of the return switch 55. The automatic braking activation notifying lamp 63 turns off when the return switch 55 is operated and the automatic braking is released.

The automatic braking activation notifying lamp 63 is not limited to a lamp and may also emit a sound. Moreover, instead of the automatic braking activation notifying lamp 63, the notification may be displayed on a display panel such as a monitor.

The means for notifying the operator of information with the abovementioned warning system 24 may be selected from a lamp, a sound, or a monitor as appropriate.

(Detection System 25)

Figure 4:
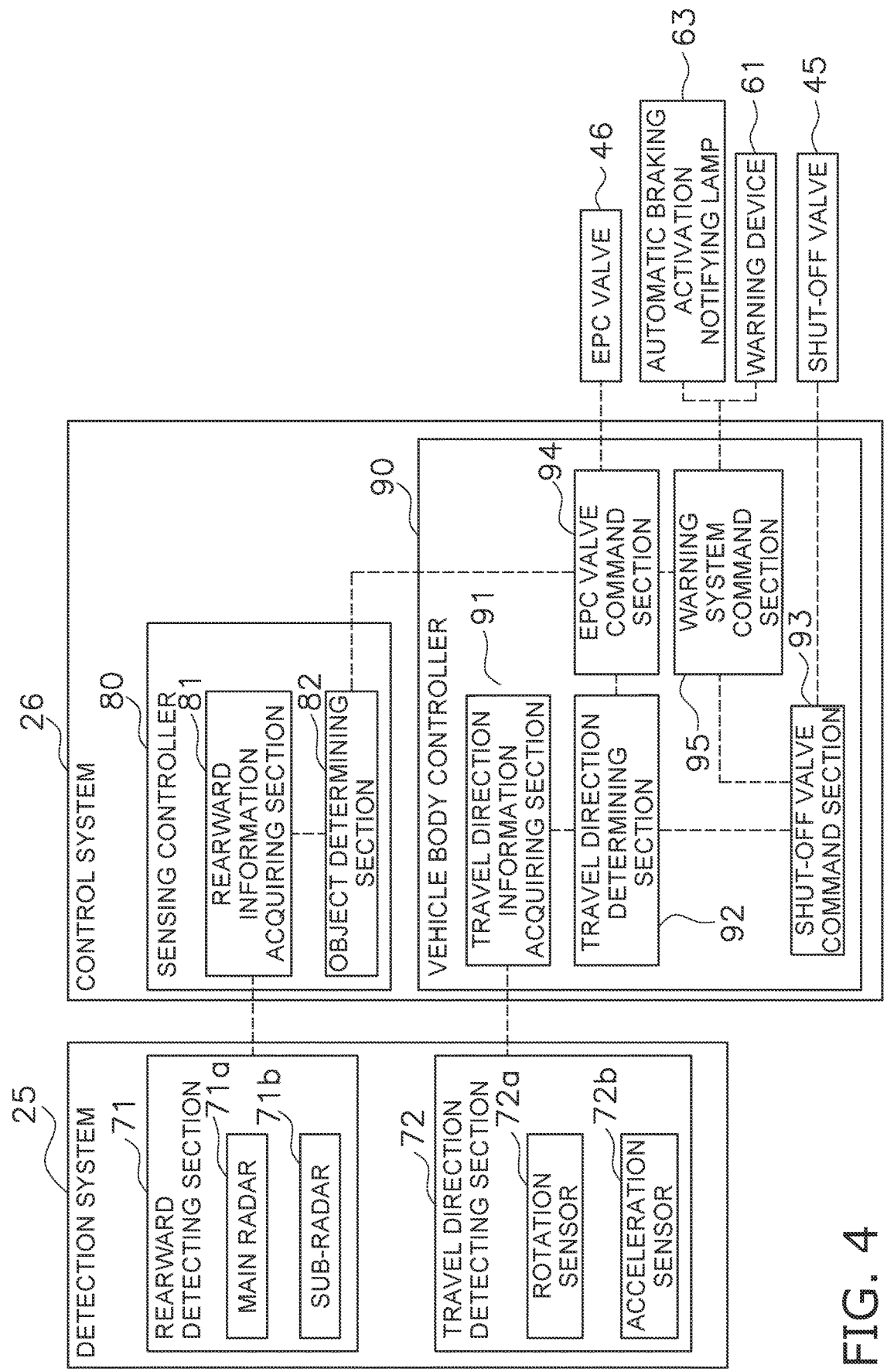
FIG. 4 is a block diagram illustrating configurations of a detection system and the control system in FIG. 2.

FIG. 4 is a block diagram of configurations of the detection system 25 and the control system 26.

The detection system 25 has the rearward detecting section 71 (example of an object detecting section) and the travel direction detecting section 72.

The rearward detecting section 71 detects information relating to a state to the rear of the vehicle body 1. While the rearward detecting section 71 is attached, for example, to the rear end of the vehicle body 1 as illustrated in FIG. 1, the attachment may not be limited to the rear end.

The rearward detecting section 71 has a main radar 71a and a sub-radar 71b. The main radar 71a and the sub-radar 71b are, for example, millimeter wave radars. By comprising the main radar 71a and the sub-radar 71b, an object to the rear can be detected by one of the radars even when the other radar has failed.

Each of the main radar 71a and the sub-radar 71b detects, with a reception antenna, a state in which a radio wave in a millimeter wave band emitted from a transmission antenna reflects off the surface of the object and returns. The information detected by the main radar 71a and the sub-radar 71b is transmitted to the control system 26 and the control system 26 is able to determine whether an object is present to the rear of the vehicle body 1. In addition, the control system 26 may also calculate the distance to the detected object.

The travel direction detecting section 72 detects information related to the travel direction of the vehicle body 1. The control system 26 determines the travel direction of the vehicle body 1 on the basis of the information detected by the travel direction detecting section 72. The travel direction detecting section 72 has a rotation sensor 72a and an acceleration sensor 72b. The rotation sensor 72a detects the rotating direction of the front tires 4 or the rear tires 7. The acceleration sensor 72b detects the acceleration of the vehicle body 1.

Whether the vehicle body 1 is in a state of traveling forward, stopped, or traveling in reverse can be determined by using the information of the rotation sensor 72a and the acceleration sensor 72b.

(Control System 26)

The control system 26 has a sensing controller 80 and a vehicle body controller 90.

The sensing controller 80 and the vehicle body controller 90 each has a processor such as a central processing unit (CPU), a main memory that includes a non-volatile memory such as a read-only memory (ROM) and a volatile memory such as a random access memory (RAM), and a storage. The sensing controller 80 and the vehicle body controller 90 each reads a program stored in the storage and expands the program in the main memory, and executes a predetermined process according to the program. While the sensing controller 80 and the vehicle body controller 90 are each described as including a CPU in the present embodiment, the sensing controller 80 and the vehicle body controller 90 may also share one CPU. In addition, the program may be distributed to the sensing controller 80 and the vehicle body controller 90 over a network.

The sensing controller 80 detects the presence of an object on the basis of the information detected by the rearward detecting section 71. The vehicle body controller 90 implements the automatic braking control on the basis of the detection result of the sensing controller 80. The vehicle body controller 90 sets the braking system 22 so that a braking force produced by the automatic braking cannot be exerted when the vehicle body 1 is traveling forward.

The sensing controller 80 has a rearward information acquiring section 81 and an object determining section 82.

Figure 5:
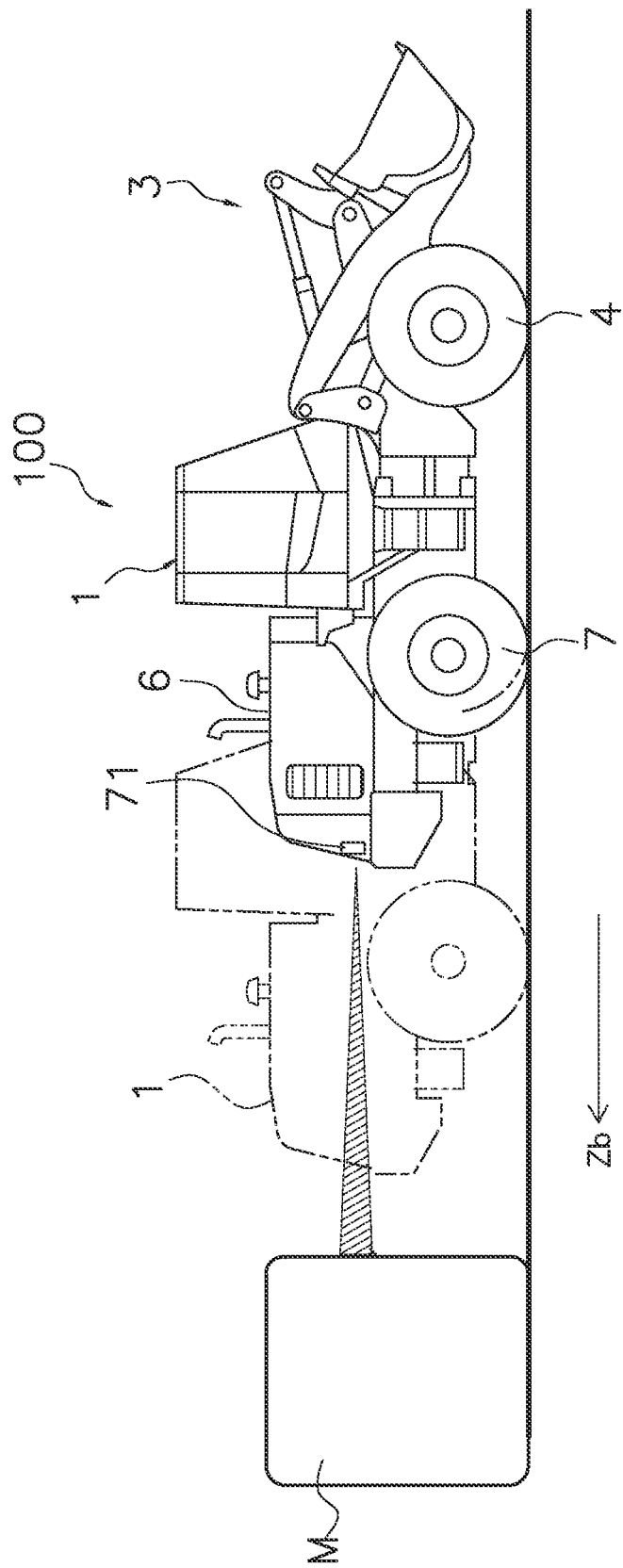
FIG. 5 is a side view for explaining automatic braking according to obstacle detection in the wheel loader of FIG. 1.

The rearward information acquiring section 81 acquires information relating to the rear detected by the main radar 71a and the sub-radar 71b of the rearward detecting section 71. The object determining section 82 determines whether an object is present to the rear on the basis of the acquired information relating to the rear. The determination result by the object determining section 82 is transmitted to a below mentioned EPC valve command section 94. FIG. 5 is a view illustrating a state in which an object M is present to the rear of the wheel loader 100.

The vehicle body controller 90 has a travel direction information acquiring section 91, a travel direction determining section 92, a shut-off valve command section 93, the EPC valve command section 94, and a warning system command section 95.

The travel direction information acquiring section 91 acquires the detection information by the rotation sensor 72a and the acceleration sensor 72b.

The travel direction determining section 92 determines the travel direction of the vehicle body 1 on the basis of the acquired detection information. Because the automatic braking control is implemented when an object is detected to the rear during reverse travel in the present embodiment, the travel direction determining section 92 determines whether the vehicle body 1 is traveling in reverse on the basis of the information of the rotation sensor 72a and the acceleration sensor 72b. With regard to the determination of the travel direction, in addition to the detection result of the rotation sensor 72a and the acceleration sensor 72b, the fact that the FNR lever 52 is positioned in reverse travel may also be used in combination. For example, even if the front tires 4 and the rear tires 7 are in a stopped state of not rotating, the vehicle body 1 may be determined as in the reverse travel state when the FNR lever 52 is set to the position of reverse travel. A potentiometer may be provided as a position detection sensor for detecting the position of the FNR lever 52, or a switch may be provided for each of the forward travel position, the reverse travel position, and the neutral position. Both may be provided so that detection is possible even if one of the operation of the potentiometer and the switch malfunctions. The shut-off valve command section 93 issues the open command to the shut-off valve 45 when it is determined by the travel direction determining section 92 that the vehicle body 1 is traveling in reverse. As a result, a state is entered in which the shut-off valve 45 is energized and the shut-off valve 45 enters the open state, hydraulic fluid is supplied from the hydraulic fluid supply channel 44b to the EPC valve 46, and a braking force is exerted when the automatic braking is implemented. Conversely, when the travel direction determining section 92 has determined that the vehicle body 1 is traveling forward, the shut-off valve command section 93 issues the close command to the shut-off valve 45. When the close command is transmitted, the shut-off valve 45 enters a non-energized state and hydraulic fluid is not supplied to the EPC valve 46 due to the closed state.

The EPC valve command section 94 issues the open command to the EPC valve command section 94 when it is determined by the object determining section 82 that an object is present to the rear of the vehicle body 1 when it is determined by the travel direction determining section 92 that the vehicle body 1 is traveling in reverse. The opening degree of the EPC valve 46 may be previously set or may be regulated on the basis of the distance to the detected object. For example, deceleration for stopping before the detected object is calculated from the distance to the object, and the EPC valve command section 94 may transmit an open command to the EPC valve 46 so that an opening degree for exerting said deceleration is obtained.

The solenoid of the EPC valve 46 is operated on the basis of the open command, the open state is entered, and hydraulic fluid is supplied from the EPC valve 46 to the rear shuttle valve 47a and the front shuttle valve 47b. In the rear shuttle valve 47a, the higher pressure among the hydraulic fluid from the rear brake valve 41a and the hydraulic fluid from the EPC valve 46 is supplied to the brake circuit 42a and the braking force is exerted. In the front shuttle valve 47b, the higher pressure among the hydraulic fluid from the front brake valve 41b and the hydraulic fluid from the EPC valve 46 is supplied to the brake circuit 42b and the braking force is exerted. As a result, the automatic braking is implemented and the braking force is exerted even if the brake pedal 54 is not operated by the operator, and the vehicle body 1 can be stopped before the object M as illustrated in FIG. 5. The vehicle body 1 in the stopped state is illustrated with the chain double-dashed lines.

Conversely, because hydraulic fluid is not supplied to the EPC valve 46 in the state in which the shut-off valve 45 is closed, hydraulic fluid is not supplied from the EPC valve 46 to the shuttle valve unit 47 even when, for example, the EPC valve 46 enters the open state due to a malfunction. As a result, the braking force is not exerted even when the automatic braking is implemented. Consequently, even if the automatic braking were implemented during forward travel due to a malfunction for example, the vehicle body 1 is not stopped because the braking force is not exerted, and work is not hindered.

Even if the braking force is not exerted due to the automatic braking, the operator operates the brake pedal 54 and the brake circuits 42a and 42b operate when hydraulic fluid is supplied from the brake valve unit 41 to the shuttle valve unit 47.

The warning system command section 95 issues a lighting command to the automatic braking activation notifying lamp 63 and issues a drive command to the alarm device 61 when the open command is issued from the shut-off valve command section 93 and the open command is issued from the EPC valve command section 94. When the operator operates the return switch 55 and the automatic braking is released, the warning system command section 95 issues an extinction command to the automatic braking activation notifying lamp 63 and issues a stop command to the alarm device 61.

(Actions)

Next, the control actions of the wheel loader 100 of the present embodiment will be explained.

Figure 6:
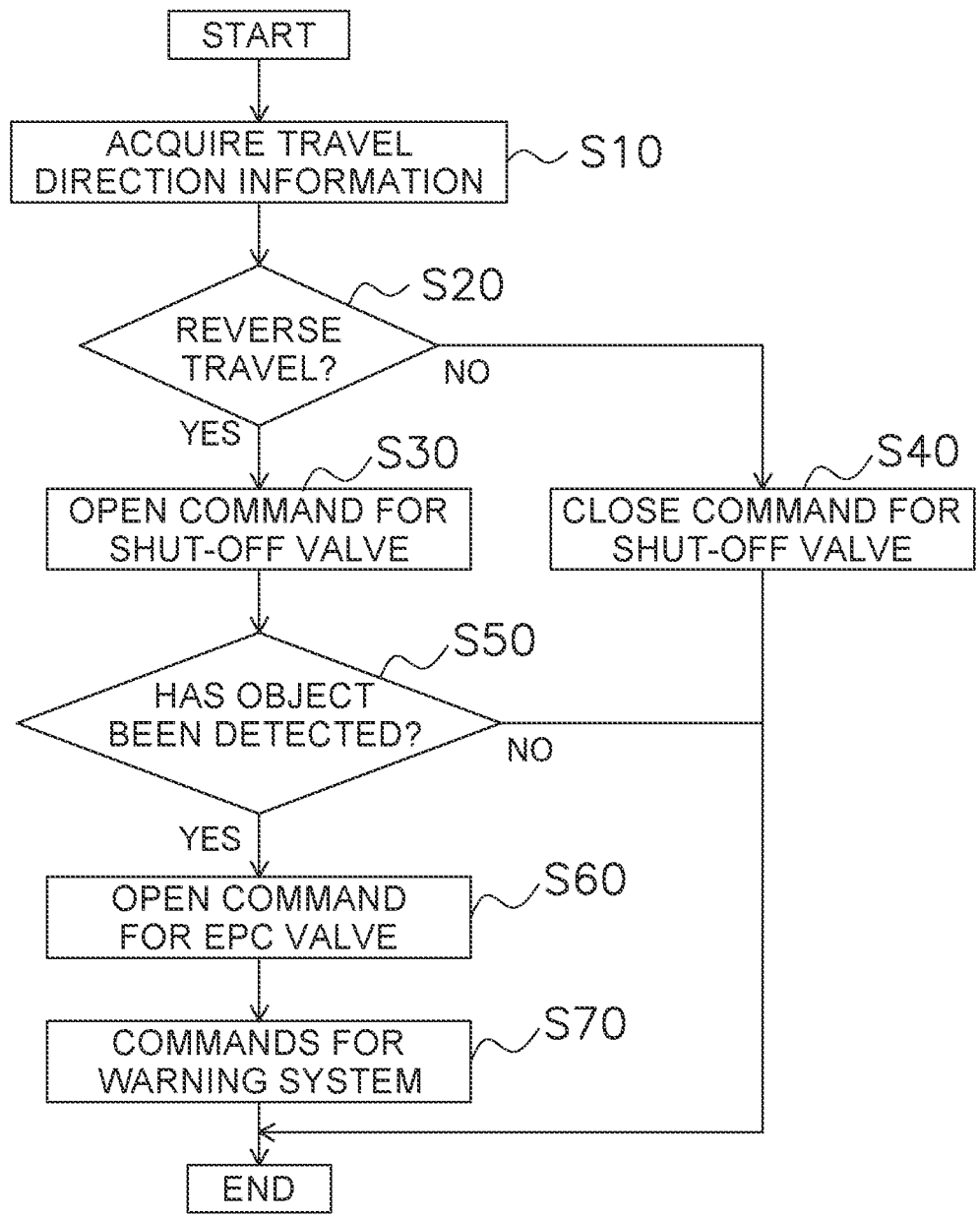
FIG. 6 is a flow chart illustrating the control actions of the wheel loader of an embodiment in the present disclosure.

FIG. 6 is a flow chart illustrating the control actions of the wheel loader 100 of the present embodiment.

At first in step S10, the travel direction information acquiring section 91 acquires the detection information of the travel direction detecting section 72.

Next in step S20 (example of the travel direction detection step), the travel direction determining section 92 determines whether the travel direction of the vehicle body 1 is the reverse travel on the basis of the acquired detection information.

When it is determined that the travel direction is reverse travel in step S20, in step S30 (example of the setting step), the shut-off valve command section 93 transmits an open command to the shut-off valve 45. Consequently, the shut-off valve 45 is energized, the shut-off valve 45 enters the open state, and hydraulic fluid is supplied to the EPC valve 46.

When it is determined that the travel direction is forward travel and not reverse travel in step S20, in step S40 (example of the setting step), the shut-off valve command section 93 transmits a close command to the shut-off valve 45 and the control is finished. As a result, the shut-off valve 45 is in a non-energized state and the shut-off valve 45 enters the closed state. If the open or closed state of the shut-off valve 45 is known at that time, the command that is the same state as the present time may not be transmitted. For example, when the shut-off valve 45 is currently in the closed state, the close command may not be transmitted again.

When the object determining section 82 has determined that an object is present to the rear of the vehicle body 1 in step S50 (example of the object detection step) after step S30, the control advances to step S60. Conversely, when the object determining section 82 determines in step S50 that no object is present to the rear of the vehicle body 1, the control is finished.

Next in step S60, the EPC valve command section 94 issues the open command to the EPC valve 46. As a result, the solenoid of the EPC valve 46 is operated, the open state is entered, and hydraulic fluid is supplied from the EPC valve 46 via the rear shuttle valve 47a and the front shuttle valve 47b to the brake circuits 42a and 42b, and the braking force due the automatic braking is exerted.

Next in step S70, the warning system command section 95 issues the lighting command to the automatic braking activation notifying lamp 63 and issues the warning command to the alarm device 61. As a result, the automatic braking activation notifying lamp 63 is turned on and a warning is emitted by the alarm device 61.

As described above, when the object M is detected to the rear while the vehicle body 1 is traveling in reverse, the vehicle body 1 is able to stop before the object M due to the automatic braking (see FIG. 5). Conversely, while the vehicle body is traveling forward, because the shut-off valve 45 is closed and hydraulic fluid is not supplied to the EPC valve 46, stoppage of the vehicle body 1 can be prevented by not exerting the braking force even if the automatic braking is implemented due to a malfunction.

(Characteristics)

(1)

The wheel loader 100 (example of a work machine) of the present embodiment comprises the vehicle body 1, the travel direction detecting section 72, the rearward detecting section 71 (example of the object detecting section), the braking section 40, the shut-off valve 45 (example of the setting section), and the control system 26 (example of the control section). The vehicle body 1 is able to travel. The rearward detecting section 71 detects an object in the rearward direction (example of a predetermined direction) of the vehicle body 1. The braking section 40 is able to implement automatic braking for automatically braking the vehicle body 1 and exert a braking force based on the detection of the object by the rearward detecting section 71. The shut-off valve 45 sets the braking section 40 so that the braking force by the automatic braking can be or cannot be exerted. The control system 26 controls the shut-off valve 45 to set the braking section 40 so that a braking force can be exerted when the vehicle body 1 is traveling in the rearward direction, and to set the braking section 40 that a braking force cannot be exerted when the vehicle body 1 is traveling in a direction other than the rearward direction.

As a result, because the braking force is exerted by means of the automatic braking when an object is detected only when traveling in the rearward direction, the braking force cannot be exerted even when the control of the automatic braking is implemented due to a malfunction when traveling in a direction other than the rearward direction (forward travel). As a result, malfunctions are suppressed and the braking force can be exerted by means of the automatic braking only in the desired travel direction.

(2)

In the wheel loader 100 of the present embodiment, the control system 26 controls the braking section 40 so as to implement the automatic braking when an object is detected by the rearward detecting section 71 when the vehicle body 1 is traveling in the rearward direction.

As a result, the vehicle body 1 can be stopped automatically when an object is detected in the rearward direction.

(3)

In the wheel loader 100 of the present embodiment, the braking section 40 has the brake circuits 42a, 42b (example of the service brake) and the EPC valve 46 (example of the regulating valve). The EPC valve 46 is able to regulate the supply amount of hydraulic fluid to the brake circuits 42a and 42b.

As a result, the automatic braking can be implemented by means of the brake circuits 42a and 42b which are service brakes.

(4)

In the wheel loader 100 of the present embodiment, the shut-off valve 45 is able to shut off the supply of hydraulic fluid to the EPC valve 46. The control system 26 controls the shut-off valve 45 and sets the braking section 40 so that a braking force cannot be exerted by shutting off the supply of hydraulic fluid to the EPC valve 46, and sets the braking section 40 so that a braking force can be exerted by supplying hydraulic fluid to the EPC valve 46.

As a result, the setting so that the braking force by the automatic braking can be or cannot be exerted can be performed by opening and closing the shut-off valve 45.

(5)

In the wheel loader 100 of the present embodiment, the travel direction detecting section 72 has at least one of the rotation sensor 72a, the acceleration sensor 72b, and a position detection sensor (not illustrated). The rotation sensor 72a detects the rotation of the front tires 4 (example of wheels) or the rear tires 7 (examples of wheels) of the traveling unit 2. The acceleration sensor 72b detects the acceleration of the traveling unit 2. The position detection sensor detects the position of the FNR lever 52. The control system 26 determines the travel direction of the vehicle body 1 on the basis of the detection of the rotation sensor 72a, the acceleration sensor 72b, or the position detection sensor.

As a result, the travel direction of the vehicle body can be determined.

(6)

In the wheel loader 100 of the present embodiment, the braking section 40 comprises the rear shuttle valve 47a and the front shuttle valve 47b, and the rear brake valve 41a and the front brake valve 41b. The rear shuttle valve 47a and the front shuttle valve 47b supply hydraulic fluid to the brake circuits 42a and 42b. The rear brake valve 41a and the front brake valve 41b regulate the flow rate of the hydraulic fluid drained to the rear shuttle valve 47a and the front shuttle valve 47b on the basis of the operation of the brake pedal 54. The EPC valve 46 supplies hydraulic fluid to the rear shuttle valve 47a and the front shuttle valve 47b. The rear shuttle valve 47a supplies the hydraulic fluid having higher pressure among the hydraulic fluid supplied from the EPC valve 46 and the hydraulic fluid supplied from the rear brake valve 41a. The front shuttle valve 47b supplies the hydraulic fluid having higher pressure among the hydraulic fluid supplied from the EPC valve 46 and the hydraulic fluid supplied from the front brake valve 41b.

As a result, when the brake pedal 54 is activated by the operator, the braking by means of the operation of the brake pedal 54 can be performed when the pressure of the hydraulic fluid from the brake pedal 54 is high.

(7)

The wheel loader 100 of the present embodiment further comprises the work implement 3, the front frame 11, and the rear frame 12. The work implement 3 is attached to the front frame 11. The rear frame 12 is attached to the front frame 11 is a swingable manner.

As a result, malfunctions are suppressed and the braking force can be exerted by means of the automatic braking only in the desired travel direction in the wheel loader.

(8)

The control method of the wheel loader 100 of the present embodiment comprises the step S20 (example of the travel direction detection step), the step S50 (example of the object detection step), and the steps S30 and S40 (examples of the setting steps). The step S20 involves detecting the travel direction of the vehicle body 1. The step S50 involves detecting an object in the rearward direction (example of a predetermined direction) of the vehicle body 1. The steps S30 and S40 involve setting so that a braking force can be exerted by implementing the automatic braking for automatically braking the vehicle body 1 on the basis of the detection of an object in step S50 when the vehicle body 1 is traveling in the rearward direction, and setting so that the automatic braking cannot be implemented so that a braking force cannot be exerted when the vehicle body 1 is traveling in a direction other than the rearward direction.

As a result, because the braking force is exerted by means of the automatic braking when an object is detected only when traveling in the rearward direction, the braking force cannot be exerted even when the control of the automatic braking is implemented due to a malfunction when traveling in a direction other than the rearward direction (forward travel). As a result, malfunctions are suppressed and the braking force can be exerted by means of the automatic braking only in the desired travel direction.

OTHER EMBODIMENTS

Although an embodiment of the present invention has been described so far, the present invention is not limited to the above embodiment and various modifications may be made within the scope of the invention.

(A)

While the travel direction detecting section 72 in the above embodiment has the main radar 71*a* and the sub-radar 71*b*, the travel direction detecting section 72 may have cameras or the like without being limited to radars. The automatic braking is implemented when the presence of an object is detected rearward by the rearward detecting section 71 during reverse travel.

(B)

Figure 7:
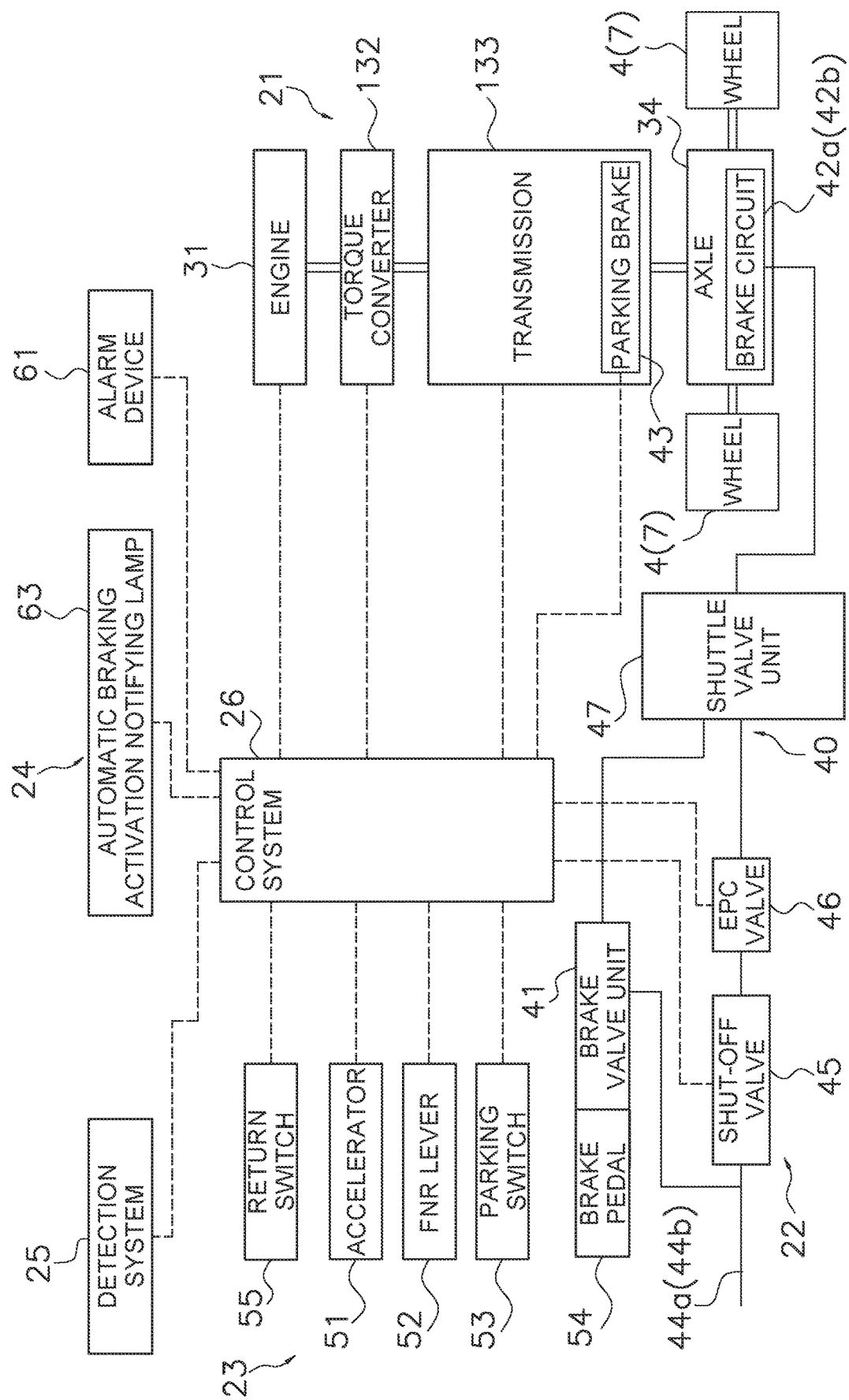
FIG. 7 is a block diagram illustrating configurations of a driving system, a braking system, an operating system, and a warning system, a detection system, and a controller of the wheel loader in a modified example of the embodiment according to the present disclosure.

While the HST 32 is used in the driving system 21 in the above embodiments, the present invention is not limited to an HST and a torque converter may be used. FIG. 7 is a block diagram illustrating a configuration in which a torque converter 132 and a transmission 133 are provided in the driving system 21. The driving power from the engine 31 is transmitted to the transmission 133 through the torque converter 132. The transmission 133 changes the rotational driving power of the engine 31 transmitted through the torque converter 132 and transmits the rotational driving power to the axles 34. The parking brake 43 is provided to the transmission 133.

Furthermore, the present invention is not limited to an HST and a hydro mechanical transmission (HMT) may also be used.

(C)

The wheel loader of the above embodiments may be operated while an operator has boarded the wheel loader, and the wheel loader may also be operated in an unmanned manner.

(D)

While the explanation has been described by using a wheel loader as an example of the work machine in the above embodiment, the work machine is not limited to a wheel loader and may also be a hydraulic excavator or the like.

According to the work machine and the control method for the work machine of the present invention, the present invention demonstrates the effect that work efficiency can be improved and is useful as a wheel loader or the like.

What is claimed is:

1. A work machine comprising:
   a vehicle body configured to be travelable;
   a travel direction detecting section configured to detect a travel direction of the vehicle body;
   an object detecting section configured to detect an object in a predetermined direction of the vehicle body;
   a braking section configured to be able to implement automatic braking in order to automatically brake the vehicle body and exert a braking force based on a detection of the object by the object detecting section;
   a setting section configured to set the braking section so that the braking force by the automatic braking can be or cannot be exerted; and
   a control section configured to control the setting section based on the travel direction detected by the travel direction detecting section,
   the control section being configured to
      to control the setting section so that the braking section can exert the braking force when the vehicle body is traveling in the predetermined direction, and
      to control the setting section so that the braking section cannot exert the braking force when the vehicle body is traveling in a direction other than the predetermined direction.

2. The work machine according to claim 1, wherein the control section is configured to control the braking section so as to implement the automatic braking when the object is detected by the object detecting section when the vehicle body is traveling in the predetermined direction.

3. The work machine according to claim 1, wherein the predetermined direction is a rearward direction.

4. The work machine according to claim 1, wherein the braking section includes
   a service brake and
   a regulating valve configured to regulate a supply amount of hydraulic fluid to the service brake.

5. The work machine according to claim 4, wherein the setting section includes a shut-off valve configured to shut off the supply of the hydraulic fluid to the regulating valve, and
   the control section is configured to
      control the shut-off valve to a closed state, thereby shutting off the supply of the hydraulic fluid to the regulating valve so that the braking section cannot exert the braking force, when the vehicle body is traveling in a direction other than the predetermined direction, and
      control the shut-off valve to an open state, thereby supplying the hydraulic fluid to the regulating valve so that the braking section can exert the braking force, when the vehicle body is traveling in the predetermined direction.

6. The work machine according to claim 1, wherein the travel direction detecting section includes at least one of
   a rotation sensor configured to detect a rotation of a wheel of the vehicle body,
   an acceleration sensor configured to detect an acceleration of the vehicle body, and
   a position detection sensor configured to detect a position of an FNR lever, and
   the control section is configured to determine the travel direction of the vehicle body based on a detection of the rotation sensor, the acceleration sensor, or the position detection sensor.

7. The work machine according to claim 4, wherein the braking section further includes
   a shuttle valve configured to supply hydraulic fluid to the service brake, and
   a brake valve configured to regulate a flow rate of the hydraulic fluid drained to the shuttle valve based on an operation of a brake pedal,
   the regulating valve supplies hydraulic fluid to the shuttle valve, and
   the shuttle valve supplies, to the service brake, the hydraulic fluid having higher pressure of
      the hydraulic fluid supplied from the regulating valve and
      the hydraulic fluid supplied from the brake valve.

8. The work machine according to claim 1, wherein the work machine is a wheel loader, and further comprises:
- a work implement;
- a front frame to which the work implement is attached; and
- a rear frame attached to the front frame in a swingable manner.

9. A control method for a work machine that includes a vehicle body, a braking section configured to perform automatic braking to automatically brake the vehicle body by exerting a braking force, and a setting section configured to set the braking section so that the braking force by the automatic braking can be exerted or cannot be exerted, the control method comprising:
- detecting a travel direction of the vehicle body;
- detecting an object in a predetermined direction of the vehicle body;
- controlling the setting section so that the braking section can exert the braking force of the automatic braking based on detection of the object when the vehicle body is traveling in the predetermined direction; and
- controlling the setting section so that the braking section can exert the braking force when the vehicle body is traveling in a direction other than the predetermined direction.

* * * * *